2,926,105

PRESSURE-SENSITIVE ADHESIVE TAPE

Armin H. Steinhauser and Harold J. Revoir, St. Paul, Minn., assignors to Minnesota Mining and Manufacturing Company, St. Paul, Minn., a corporation of Delaware No Drawing. Application July 2, 1956
Serial No. 595,078

2 Claims. (Cl. 117—76)

This invention relates to pressure-sensitive adhesive tape of the well-known type having a non-fibrous hydrophilic film backing (such as cellophane) coated with a pressure-sensitive rubbery-base adhesive (which is normally and aggressively tacky), wherein the film backing has been primed prior to coating with the adhesive so as to provide an interposed primer coating of extreme thinness which unites the adhesive to the backing film much more tightly than would be the case in the absence of the primer. The present invention provides a novel and improved primer.

The primer is employed to assure retention of the integrity of the tape when unwound from the roll and when removed from smooth surfaces (such as glass or metal) to which temporarily applied, avoiding delamination which might otherwise occur under severe or unusual conditions of use, especially if the tape roll has been subjected to highly humid atmospheric conditions during storage or during exposure to the atmosphere when mounted in a dispenser. The aggressively tacky adhesive adheres to the surface from which the tape is being removed and this results in a force tending to delaminate the adhesive from its backing.

The difficulty arises because of the relatively poor affinity between the hydrophobic adhesive layer and the smooth, dense, non-porous, glassy, hydrophilic surface of the film backing. Regenerated cellulose films (cellophane) include a hygroscopic water-soluble softening agent (such as glycerine or a glycol) and a substantial proportion of adsorbed water which is materially increased when the film is exposed to highly humid atmospheres from which moisture is adsorbed. The rubbery-base pressure-sensitive adhesives are commonly compounded of a natural or synthetic rubber and a tackifying resin (such as a rosin derivative or a hydrocarbon type resin), or of a rubbery polymer that is intrinsically tacky (such as a polyacrylate or a polyvinyl ether polymer), and are inherently water-repellent. The strength of bond between the adhesive and the hydrophilic film surface, when there is direct contact, is approximately the same as the adhesion to other smooth surfaces to which the tape may be applied such as glass, metal wood and cellophane. In order to provide a stronger bond between the adhesive and the backing film, an interposed primer has commonly been employed which has high internal strength and which strongly bonds to each of the disparate materials which it contacts, namely, the hydrophilic film and the hydrophobic pressure-sensitive adhesive coating. Thus the primer must be capable of strongly bonding to each of two quite different surfaces.

Examples of hydrophilic films in addition to regenerated cellulose (cellophane) are films of hydroxy ethyl cellulose, methyl cellulose, polyvinyl alcohol, and films of cellulose acetate that have been treated to provide a hydrophilic surface (as by hydroxylating the surface by treatment with sodium hydroxide solution). Metal foils, such as aluminum foil, also have a hydrophilic surface.

The U.S. patent of R. G. Drew, No. 2,328,066 (August 31, 1943) disclosed a type of primer for this usage which has been extensively employed. His patent taught priming of hydrophilic cellulosic films (such as cellophane) by the application of an aqueous emulsion of a hydrophilic colloidal agglutinant (such as casein) and a latex of natural or synthetic rubber which is compatible with the subsequently applied adhesive coating; and he showed that the cellulosic film thus coated with the aqueous primer solution could be flash-dried so as to avoid warping and wrinkling. This type of primer is often referred to as a two-phase primer, one phase being the hydrophilic agglutinant particles and the other phase being the latex rubber particles, these particles being intermixed. The hydrophilic colloidal agglutinant particles form a strong bond to the hydrophilic cellulosic surface which is wetted by the aqueous primer system and this bond is retained when the primed film is dried to evaporate off the water. The outer surface of the dried primer coating includes particles of the rubber phase and these are compatible with the subsequently applied adhesive coating (whether applied from organic solution or from aqueous dispersion) so that upon drying of the adhesive coating it is firmly anchored to the primer. The interposed two-phase primer film thus provides a strong linkage between the pressure-sensitive adhesive layer and the cellulosic film backing which assures against delamination of the aggressively tacky adhesive when the tape is unwound from the roll or removed from surfaces to which temporarily applied.

The preferred hydrophilic colloidal agglutinant described in the Drew patent was a protein glue of which casein was the prime example and the one that has been commonly employed in commercial usage. The casein was preferably insolubilized in situ in the applied primer coating by tanning with formaldehyde during the drying operation. This was accomplished by employing an aqueous dispersion of casein and rubber latex that included ammonia and hexamethylenetetramine (formed by the reaction of formaldehyde and ammonia) so that upon drying the hexamethylenetetramine decomposed and released formaldehyde which would tan the casein particles.

We have discovered an improvement thereupon which consists in employing as the hydrophilic colloidal agglutinant component of the two-phase primer, in whole or in major proportion by weight, a water-dispersible hydrophilic polyacrylamide; a polymer which in its simplest form has the following recurring structural unit:

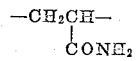

The polymer molecule thus has a hydrocarbon skeletal chain with attached amido side groups which provide hydrophilic functional groups that impart to the polymer its water-dispersible, hydrophilic character. Equivalent modified forms can be employed. Thus one of the nitrogen-bonded hydrogen atoms of some of the amido groups may be replaced by a hydrophilic functional group; preferably a methylol group introduced by a process of methylolation of the simple polyacrylamide polymer which yields a polymer that includes in the molecule structural units of the type:

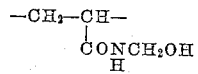

These are equivalent and the polyacrylamide polymer whether or not thus modified provides the water-dispersible hydrophilic polyacrylamide type of hydrophilic colloidal agglutinant that can advantageously be employed in the aforesaid two-phase primer.

Thus our invention is an improvement in pressure-sensitive adhesive tapes of the type having a flexible hydrophilic film backing to which is united a contacting primer film formed of the dried deposition product of an aqueous emulsion of rubber latex and hydrophilic colloidal agglutinant and having a compatible water-insoluble rubbery-base pressure-sensitive adhesive coating thereon which is firmly united to the primer film, characterized by the feature that the hydrophilic colloidal agglutinant is mainly or entirely a water-dispersible hydrophilic polyacrylamide. A minor proportion of another hydrophilic colloidal agglutinant may be included, such as casein or polyvinyl alcohol.

The preferred ratio of hydrophilic colloidal agglutinant is in the range of about 25 to 100 parts per 100 parts of rubber solids by weight.

The present primer provides a stronger anchorage at very high humidities than do the best prior two-phase primers, in which casein or polyvinyl alcohol was empolyed as the sole or principal hydrophilic agglutinant.

We have found that it is advantageous to employ as the hydrophilic colloidal agglutinant phase a mixture of a minor but substantial proportion of casein and a major proportion of the polyacrylamide, for instance ¼ casein and ¾ polyacrylamide, by weight, as this results in still stronger primer bonding when the tape has been exposed to highly humid atmospheric conditions. The casein is tanned in situ during drying of the primer coating. This improved result is seemingly paradoxical inasmuch as earlier experience had shown that the use of casein alone as the hydrophilic colloidal agglutinant phase, even when tanned with formaldehyde, did not provide a primer with as good resistance to moisture as was desirable and led to the replacement of casein by polyvinyl alcohol in the manufacture of cellophane tapes to be used in areas subject to high humidity conditions, as described in U.S. Patent No. 2,328,057 (August 31, 1943).

*Example*

A presently preferred primer composition for use in the manufacture of our improved tape is prepared from the following ingredients, all parts being by weight:

| | Parts |
|---|---|
| Buna S rubber (dry basis) (as latex containing 40% solids) | 100 |
| Polyacrylamide | 43 |
| Casein | 15 |
| Aqueous formaldehyde solution (37% conc.) | 68.8 |
| Ammonium hydroxide solution (28% conc.) | 50.5 |
| Fungicide | 0.3 |
| Water (iron free)—approximately | 550 |

Buna S rubber is a term applied to rubbery butadiene-styrene copolymers and a preferred type is GRS-2000. Such synthetic rubbers are commonly used in the production of rubber-resin pressure-sensitive tape adhesives.

A suitable polyacrylamide is the medium molecular weight grade available under the designation "PAM 75" from American Cyanamid Company, although types of lower and higher molecular weight can be employed, such as "PAM 50" and "PAM 100," all of which are film-forming polymers that are hydrophilic and dispersible in water, and are supplied as white amorphous powders. The molecular weights are believed to lie in the general range of about 400,000 to 1,000,000.

In this example the polyacrylamide may become partially methylolated by reaction with formaldehyde in the alkaline aqueous system employed.

The fungicide is included to avoid bacterial spoilage in the event of storage for substantial periods before use. These are well known. An example is available under the trademark "Dowicide G" from Dow Chemical Company.

It will be noted that this composition employs about ¾ polyacrylamide and ¼ casein as the hydrophilic colloidal agglutinant phase of the primer. Provision is made for tanning the casein in situ during drying of the primer coating.

The following compounding procedure is employed:

An aqueous dispersion of polyacrylamide is prepared by adding successive increments of the 43 parts of polyacrylamide to about 430 parts of water in a Monel mixing kettle equipped for steam heating, and agitating at room temperature until dispersion is complete. Then 43 parts of the 28% ammonium hydroxide solution is added, followed by the 68.8 parts of 37% formaldehyde solution. A slightly exothermic reaction takes place and heating is employed so as to maintain a temperature of 40–60° C. for about two hours with continued mixing. The alkalinity of the reaction mixture is adjusted with ammonia so as to maintain the pH value in the range between 8 and 10. Formaldehyde is present which reacts with ammonia to form hexamethylenetetramine, available as a formaldehyde-releasing tanning agent for the casein.

A casein solution is separately prepared in a stainless steel mixing drum. The 15 parts of casein is added to 45 parts of water, the fungicide is added, and the mixture is allowed to stand for one hour to wet and soften the casein. Then 7.5 parts of the 28% ammonium hydroxide solution and 75 parts of hot water (at about 80° C.) are successively added and the mixture is thoroughly agitated to form a smooth dispersion.

The casein solution is added to the polyacrylamide reaction mixture and thoroughly mixed at a temperature kept under 40° C. Then the 250 parts of aqueous rubber latex (100 parts rubber solids) is incorporated with agitation, the pH value being adjusted to 10–11 with ammonium hydroxide as required. After agitation to produce a smooth emulsion, the mixture is filtered through cheesecloth and is stored in polyethylene lined drums. Additional water can be incorporated if needed to adjust the viscosity to a desired coating consistency, the viscosity after 24 hours standing at 25° C. preferably being in the range of 100 to 700 cps. as measured on a Brookfield viscosimeter.

In manufacturing cellophane adhesive tape the cellulosic backing film is coated with the primer emulsion in a wet coating weight of about 8.5 pounds per 1000 square yards resulting in a dry coating weight of about 1.1 pounds per 1000 square yards. The coated film is dried by passing around steam-heated drums so as to flash-dry the primer while the web is under tension, thereby preventing wrinkling and warping of the dried primed film. The procedures described in the aforesaid Drew Patent No. 2,328,064 can be employed. The film backing may be provided on the back (unprimed) surface with a low-adhesion backsize coating which serves to reduce the force required to unwind the adhesive tape from the roll (cf., U.S. Patents No. 2,532,011, issued Nov. 28, 1950, and No. 2,607,711, issued Aug. 19, 1952). The primed film web is coated with a solution or emulsion of a pressure-sensitive adhesive (such as one compounded of a butadiene-styrene rubbery polymer, or natural rubber, or a mixture, and a tackifying resin) and, after drying, it is slit and wound into rolls of desired size.

We claim:

1. A pressure-sensitive adhesive tape of the type having a hydrophilic film backing primed with the dried deposition product of an aqueous emulsion mixture of rubber latex and hydrophilic colloidal agglutinant and thereby firmly united to a compatible water-insoluble rubbery-base pressure-sensitive adhesive coating, the weight ratio of hydrophilic colloidal agglutinant being in the range of about 25 to 100 parts per 100 parts of latex rubber solids, characterized by the feature that at least a major proportion by weight of said hydrophilic colloidal agglutinant is a water-dispersible hydrophilic polyacrylamide.

2. A pressure-sensitive adhesive tape according to claim 1 wherein said hydrophilic colloidal agglutinant includes a minor but substantial proportion by weight of casein.

References Cited in the file of this patent

UNITED STATES PATENTS

| | | |
|---|---|---|
| 2,328,057 | Coulter | Aug. 31, 1943 |
| 2,328,066 | Drew | Aug. 31, 1943 |
| 2,476,527 | Barnes et al. | July 19, 1949 |
| 2,548,520 | Damschroder et al. | Apr. 10, 1951 |

OTHER REFERENCES

Schildknecht: Vinyl and Related Polymers, John Wiley & Sons, Inc., New York, January 1952, page 316 relied on.